United States Patent [19]
Gates

[11] 3,975,144
[45] Aug. 17, 1976

[54] CATHODE BAKING SYSTEM
[75] Inventor: Edward Jack Gates, Hot Springs, Ark.
[73] Assignee: Reynolds Metals Company, Richmond, Va.
[22] Filed: Mar. 11, 1975
[21] Appl. No.: 557,315

[52] U.S. Cl. .................................. 432/5; 432/18; 432/197; 165/104 M
[51] Int. Cl.² .......................................... F27D 5/00
[58] Field of Search ............... 432/5, 18, 192, 197; 165/104, 104 M

[56] References Cited
UNITED STATES PATENTS

| | | | |
|---|---|---|---|
| 799,127 | 9/1905 | Williams | 432/197 |
| 3,048,382 | 8/1962 | Mansfield | 432/192 |
| 3,477,703 | 11/1969 | Tamalet | 165/104 |
| 3,578,300 | 5/1971 | Goodrich | 432/197 |

*Primary Examiner*—John J. Camby
*Attorney, Agent, or Firm*—Glenn, Lyne, Gibbs, & Clark

[57] ABSTRACT

A method of baking aluminum reduction cell cathode blocks to achieve increased heating rates.

8 Claims, 1 Drawing Figure

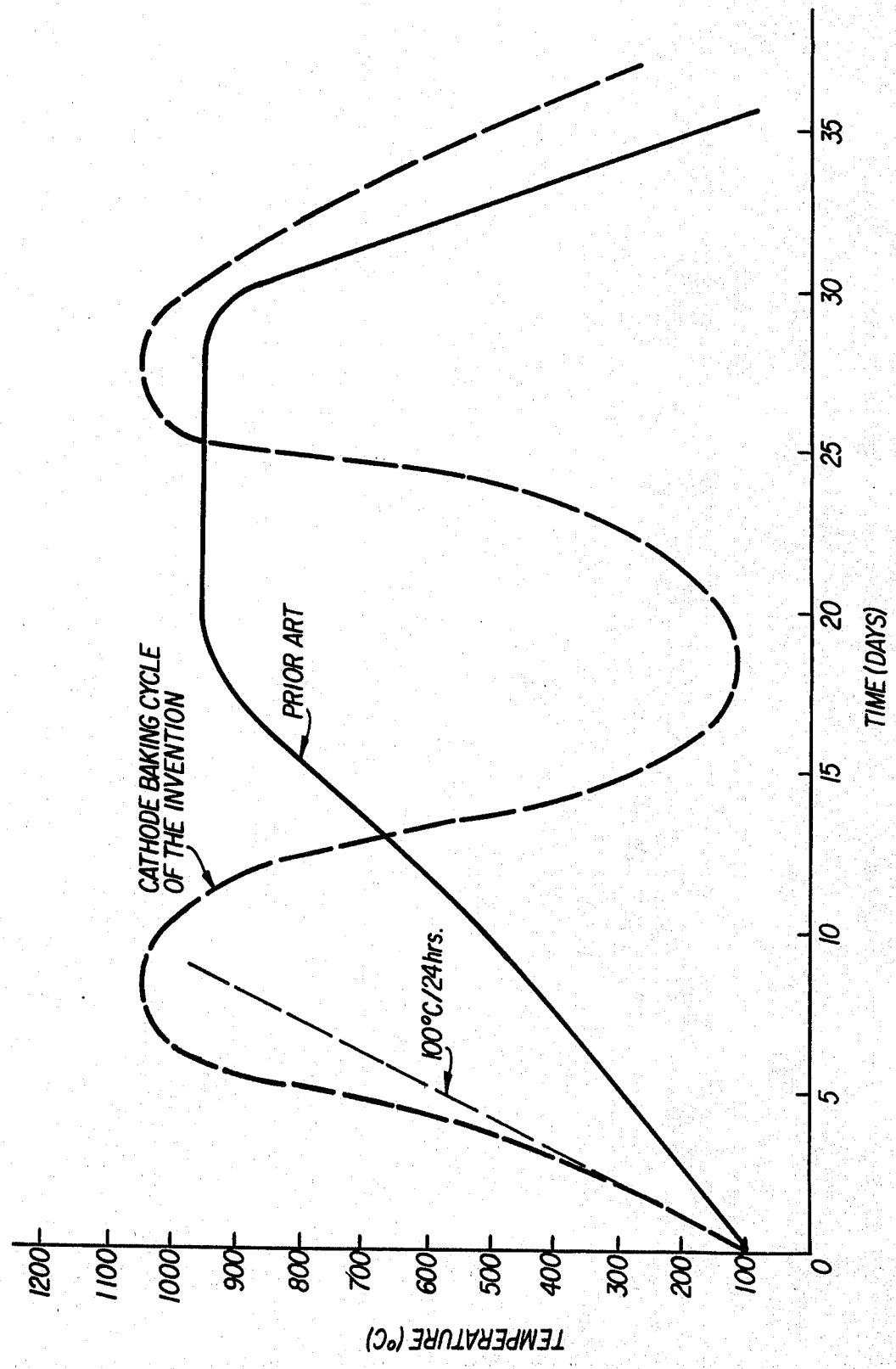

CATHODE BAKING SYSTEM

This application relates to carbon baking operations, particularly with regard to producing baked carbon bodies from mixtures of a carbonaceous aggregate such as coke and a binder such as pitch. These mixtures may be formed by molding or extruding, for example, and then baked to carbonize the binder under temperature conditions effective to obtain an electrically conductive structure.

In the aluminum industry, different forms of carbon have been used as anode and cathode electrodes of the electrolytic reduction cells. Some cells have self-baking anodes while others employ prebaked anodes. Both types commonly use either a monolithic lining or prebaked carbon blocks to form an interior cathode lining of the cell.

The baking of cathode blocks has been considered to present special problems, even compared to prebaked anodes, largely due to differences in their geometry and binder content. Prebaked anodes, for example, are conventionally prepared from relatively low pitch content mixes having a graded aggregate of calcined petroleum coke, the pitch constituting about 15% of the mixture by weight. The shaped green anode bodies are stacked in a furnace pit row by row, and packing material is filled in around the bodies of each row before the next row is added, and so on. Very rapid heating rates can be used in baking such bodies. On the other hand, cathode block mixtures usually contain more pitch (typically 30% by weight) and use calcined anthracite for at least a major portion of the aggregate, often about 75 to 100% thereof. Cathode blocks are usually baked upright on their ends and heating rates are generally much slower, based on the premise apparently that their higher pitch contents and other aspects of cathode blocks make it necessary to bake them more gradually.

With respect to geometric differences, the configuration of prebaked anodes is rather compact when compared with cathode blocks which tend to be bigger, more elongated, relatively thinner, and hence more difficult to support effectively in the furnace. In addition, cathode blocks typically have a longitudinal slot therein for receiving a steel electrical collector bar.

Due to their size, and complexity of shape, plus the complicating effect of their higher pitch content, numerous difficulties have been encountered in baking cathode blocks. These include bowing, slumping and cracking, as well as pinching of the collector bar receiving slot due to expansion of adjacent portions of the block during heating. For these and other reasons, baking operations for cathode blocks, using a conventional ring-type of pit furnace, have employed very slow heating rates (ordinarily limited to about 50°C./24 hours), thus permitting only about 14 to 18 cycles per year in operating such a furnace. As noted by Mantell in "Industrial Carbon", he indicates that the following is a typical cycle: Loading (including routine maintenance operations) 2 to 4 days; heating 12 to 20 days; cooling, 20 days; unloading, 3 to 5 days. This provides an overall cycle of 37 days (minimum) to 49 days (maximum).

Thus, the prior art practices have evidenced a conscious determination to use a heating rate for baking cathode blocks much slower than in conventional anode baking operations, in spite of the limitation this inherently imposes on the productive capacity of the furnace. In accordance with the present invention, however, it has been found that a heating rate of at least 125°C/24 hours, or more than double the rate ordinarily employed, may be used effectively when baking cathode blocks packed in fluid coke.

The use of fluid coke as a packing material in anode baking operations has been known for some time, and several benefits have been recognized. One of these is an improved flow characteristic for filling around the anode shapes. This makes it possible to stack the anodes in multiple rows without having to fill in packing material around and between the anodes of one row before placing the next row. Another benefit is the absence of dust problems previously associated with other packing materials.

Producers of carbon anodes have also found fluid coke to be desirable as a packing medium in still other ways. For one thing it was noticed that the anode blocks required relatively little cleaning after baking when compared with other materials which tended to adhere to the finished product. It was also noticed that baking was more uniform, giving rise to a more constant electrical resistance throughout the anode.

In spite of the success had with fluid coke in connection with producing anodes, the art has apparently disregarded possibilities for its use in preparing cathodes. Although some early experiments have been reported in the literature concerning fluid coke as a cathode packing material, it was evaluated simply as a substitute material, using ordinary baking cycles, and regular "delayed" coke and mixtures of sand and coke represent the extent of the choices presently accepted by the industry. Several factors may help to explain this.

Unlike anodes, cathode blocks are normally baked upright on their ends, as previously indicated, rather than in vertically separated rows, so that it is comparatively less troublesome to apply the packing material. Consequently any advantage of improved filling characteristic of fluid coke is really of little moment when dealing with cathodes.

Probably the principal reason that the cathode baking industry has neglected using fluid coke can be traced to the tendency of cathode blocks to bow or slump when heated in the plastic range of about 250° to 550°C. Because maintaining the block geometry or shape was essential, and a most critical objective, the tendency of the art was to emphasize the support characteristic of packing materials rather than their other properties. The heat transfer properties of "delayed" coke and mixtures of coke and sand were considered adequate for the slow heating rates accepted as being a necessary concomitant of baking cathode blocks, and fluid coke offered no apparent advantage in that regard.

What has been discovered in accordance with the present invention is that, when compared with conventionl packing materials, fluid coke not only demonstrates an adequate support capability but also exhibits improved heat transfer characteristics, making it surprisingly well suited to the art of cathode baking, and particularly effective with regard to baking cathode blocks at appreciably higher heating rates.

Fluid coke of the type useful for purposes of the present invention typically has a bulk density of about 75 lbs./cu. ft., compared to 110 lbs./cu. ft. for a conventional mixture of 70% sand — 30% delayed coke.

The production, use and characteristics of fluid coke are described in detail under title of "The Use of Calcined Fluid Coke As Packing Material in Anode Baking Pits", by A. N. Stuart and B. H. Pippin, appearing in Vol. 3 of "Light Metals 1974", an AIME publication.

The dimensions of representative baked blocks made in accordance with the invention are 15½ inches wide, 13 inches high and 65 inches long, with a standard longitudinal slot adapted to receive a 4 inches square collector bar. Such blocks weigh in excess of 600 lbs. each. They are prepared from mixtures of pitch and a suitable carbonaceous aggregate containing about 75 to 100% anthracite, with the pitch constituting about 28 to 35% by weight of the total mixture. For baking, a suitable 2 × 6 inches wooden "shrink stick" may be braced in the slot of each block, if desired, in accordance with customary practice, to prevent cracking. However, successful results have been achieved in some instances without the use of shrink sticks.

In accordance with the invention, a typical baking operation uses an ordinary ring-type furnace involving a four section spread of the pits for heating on a 42-hour firing cycle, per section, or a total of only 168 hours (i.e. 7 days) for heating to about 1150°C., which corresponds to an average heating rate of slightly more than 150°C./24 hours. The elongated green carbon blocks are loaded in adjoining pits of the furnace, either with or without the usual shrink sticks in the event that the blocks are slotted, as is usually the case. Fluid coke is packed around the loaded blocks to provide support and protect the blocks against burning. The furnace may be gas or oil fired, or even heated electrically. In the usual furnace construction, a heating manifold supplies natural gas for combustion to supply the necessary heat. The manifold is moved in sequential stages to provide for pre-heating in some pits, and baking in others, followed by cooling.

All of these operations may be conducted in conventional fashion, except that the heating rate employed for purposes of the present invention is very rapid, averaging more than 100°C./24 hours to a suitable finishing temperature in the range of 950°–1250°C., typically about 1150°C. Upon completion of the baking operations, the fluid coke packing material is readily removed for reuse, by using a conventional vacuum device, for example.

By way of contrast, a typical practice employed previously was to use a 5 to 6 section spread (including 3 or 4 preheat stages) with a residence time of about 6 days in each firing stage, representing a total heating cycle as long as 30 days. The practice of the present invention virtually doubles the effective capacity of an existing facility using the conventional procedure. This comparison is illustrated in the accompanying drawing. Thus, for example, 60 blocks can be baked in only about half the time required formerly to complete 72 blocks. A baking time of 8 to 10 days is typical.

Typical ring furnace constructions and conventional operating procedures are described in U.S. Pat. No. 2,699,931 (Buhler et al), and further background on the subject may be found in chapter XVI of "Industrial Carbon" (Mantell), 1946, see especially FIGS. 85 and 87 on pages 253 and 254. The illustrative practices of the present invention as described herein are based on operations in a furnace system of the type shown in FIG. 87 of Mantell, except for having a single intermediate baffle in each baking section rather than two alternately upwardly and downwardly extending baffles as shown therein.

What is claimed is:

1. In the art of baking elongated green carbon blocks prepared from a mixture consisting essentially of a carbonaceous aggregate and from about 28% to about 35% pitch based on the weight of said mixture, the improvement which comprises:
    supporting the green blocks upright on their ends within packing of calcined fluid coke in a baking furnace; and
    heating the thusly supported blocks to a temperature of about 950°–1250°C., wherein said heating through the range of 250° to 550°C. proceeds at a rate in excess of 100°C./24 hours.

2. The method of claim 1 wherein said heating through the temperature range of 250° to 550°C. is conducted at a substantially uniform rate of at least about 125°C./24 hours.

3. The method of claim 1 wherein the aggregate content of said mixture comprises about 75 to 100% calcined anthracite.

4. The method of claim 1 wherein the pitch content of said mixture is about 30% by weight.

5. The method of producing elongated electrically conductive blocks of a type used to form the cathode lining of an aluminum reduction cell, which comprises:
    forming green carbon blocks from a mixture consisting essentially of pitch and a carbonaceous aggregate comprising calcined anthracite coal, wherein the pitch constitutes from about 28% to about 35% of the mixture by weight;
    loading the green blocks into a ring furnace, with a packing of calcined fluid coke to support and protect the blocks; and
    firing the furnace to heat the thusly packed blocks therein to a temperature of about 950°–1250°C. during a period of no more than about 8 to 10 days, wherein said heating through the range of 250° to 550°C. proceeds at a rate in excess of 100°C./24 hours.

6. The method of claim 5 wherein said heating through the temperature range of 250° to 550°C. is conducted at a substantially uniform rate of at least about 125°C./24 hours.

7. The method of claim 5 wherein the aggregate content of said mixture comprises about 75 to 100% calcined anthracite.

8. The method of claim 5 wherein the pitch content of said mixture is about 30% by weight.

* * * * *